Oct. 11, 1932.  E. M. PETERSON  1,881,965
APPARATUS FOR MAKING FROZEN CONFECTIONS
Filed Aug. 8, 1931
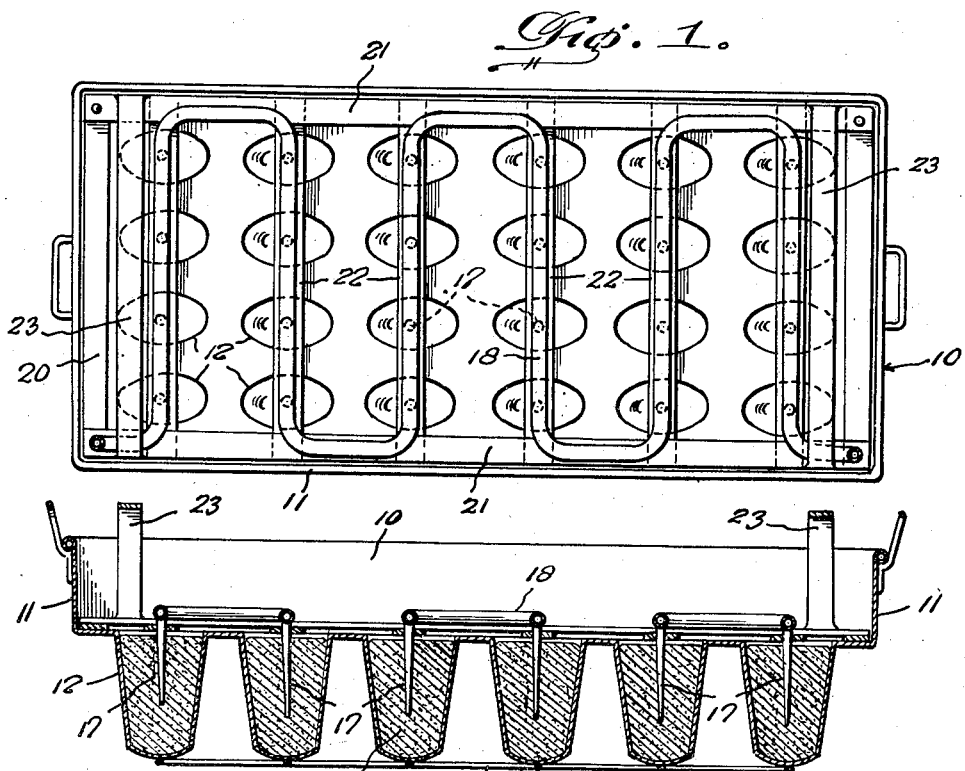
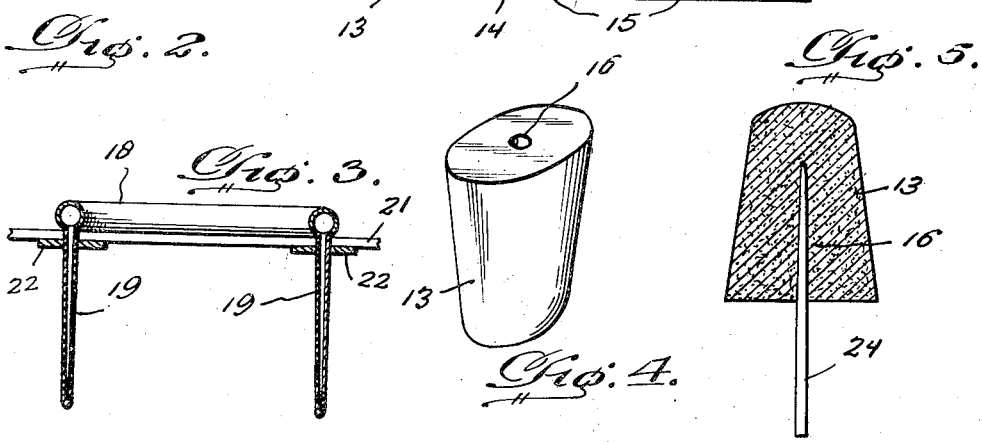
Ezra M. Peterson,
INVENTOR.
BY J. Stanley Burch
ATTORNEY.

Patented Oct. 11, 1932

1,881,965

UNITED STATES PATENT OFFICE

EZRA MORONI PETERSON, OF ODGEN, UTAH

APPARATUS FOR MAKING FROZEN CONFECTIONS

Application filed August 8, 1931. Serial No. 555,989.

The present invention comprehends the provision of an apparatus for making frozen confections which can be eaten without the necessity of touching the confections with the hands.

In carrying out the invention I contemplate a novel construction of means for making a frozen confection with a centrally located bore adapted to receive a stick for supporting and handling the confection while the latter is being consumed.

In accordance with the present invention I provide a finger adapted to be positioned in each mold in which the confections are frozen, and after the confection has been frozen therein, the finger is heated to facilitate its removal from the frozen article, thereby leaving the latter with a bore to accommodate a stick for the purpose above-mentioned.

The nature and advantages of the invention will be readily understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a top plan view of the apparatus.

Figure 2 is a longitudinal sectional view therethrough.

Figure 3 is a fragmentary sectional view of a modified construction.

Figure 4 is a detail view of the frozen confection.

Figure 5 is a sectional view therethrough showing how it is supported by a stick.

The apparatus forming the subject matter of the present invention comprises a receptacle-like member including a plurality of molds adapted to be filled with a liquid substance to be frozen therein. The receptacle-like member can of course vary in size and configuration without departing from the inventive idea, and preferably embodies opposed side and end walls 10 and 11 respectively, while depending from the bottom of this member, and preferably formed integrally therewith are a plurality of molds 12. These molds may vary in size and contour, but are preferably of the configuration illustrated in the drawing, and these molds of course open into the receptacle-like member through openings in the bottom thereof. Each mold is adapted to be filled with a liquid substance to be frozen therein, in any suitable manner in the production of the frozen confection indicated at 13. As clearly illustrated in Figure 1, the molds 12 are suspended from the bottom of the receptacle-like member in transverse rows, and all of these molds are suitably connected and braced by a suitable frame including crossed longitudinal and transverse rods 14 and 15 respectively, which are secured to the bottoms of the molds as illustrated.

For the purpose of providing each frozen confection 13 with a centrally located stick-receiving bore 16, I employ a plurality of fingers 17, one for each mold 12, and these fingers are adapted to be suspended within the molds, after the latter have been filled with the liquid substance to be frozen therein. After the fingers 17 have been positioned within the various molds 12, the entire structure is subjected to refrigeration, with a view of freezing the substance in the molds, after which the fingers 17 are removed, thereby leaving each frozen confection 13 with a centrally located bore 16. In order to facilitate the removal of the fingers 17 from the frozen confection, the fingers are heated, and while this may be accomplished in various ways, I preferably employ a suitable heating unit which constitutes a support for the fingers 17, the latter being preferably integrally connected therewith and depending therefrom. The heating unit is adapted to be arranged horizontally in the receptacle-like member 10, and may be of any suitable or desired character, although I have specifically illustrated a heating unit made up of continuous coils 18 of substantially U-shaped formation arranged side by side, and through which heating element is adapted to be passed a hot fluid, such as water, steam, air or the like. The heat is radiated from the heating unit to the fingers 17 for the purpose above stated. In one form of the invention, as illustrated in Figure 2, the fingers may be solid, or these fingers may be constructed as illustrated in Figure 3, in which instance the fingers are of hollow formation as indicated at 19. The fingers are of course of any desired length and diameter, and preferably tapered toward their free ends to provide a correspondingly shaped bore 16 in the frozen confection 13 so that the stick which is inserted can be securely wedged in the confection.

By virtue of the construction hereinabove described, it is manifest that all of the fingers 17 can be removed from the molds, or frozen confections therein, simultaneously, because they are all carried by the heating unit 18. To facilitate this operation, I preferably employ a frame-like member composed of spaced parallel side and end members 20 and 21 respectively, and a plurality of transverse members 22 which connect the side members 20, and located to traverse each transverse row of molds 12 as illustrated in Figures 1 and 2. Each transverse member 22 constitutes a support for one portion of the heating element, and is also provided with a plurality of spaced openings through which the fingers 17 project into the molds. In other words, the heating unit reposes upon the frame-like member as illustrated in Figure 2, so that when it is desired to remove the fingers from the frozen confections, it is only necessary to lift the frame-like member out of the receptacle 10, which may be easily accomplished by use of the handles 23.

For disposition or sale, each frozen confection 13 is placed in a wax paper container or wrapper, from which the frozen confection can be very easily and conveniently removed. For each frozen confection 13 I provide a stick 24 adapted to be received by the bore 16 of the frozen article, as clearly illustrated in Figure 5. For this purpose, the frozen confection while in its container is held in one hand, while the stick is inserted in the bore 16, after which the container can be removed, thus permitting the confection to be held and handled while being consumed without being touched by the hands. The sticks 24 are preferably maintained in a cold condition until use is desired, so that when the stick is inserted within the bore 16 it will not tend to soften or enlarge the diameter of the bore while the article is being eaten or consumed.

While it is believed that from the foregoing description the nature and advantages of the invention will be readily apparent, I desire to have it known that I do not limit myself to what is herein illustrated or described, and that such changes may be resorted to when desired as fall within the scope of what is claimed.

What I claim as new is:

1. An apparatus of the character described comprising a receptacle-like member including a plurality of molds depending from the bottom thereof and adapted to be filled with a liquid substance to be frozen therein, a finger adapted to be inserted in each mold to provide the article frozen therein with a centrally located stick-receiving bore, and a heating unit arranged within said receptacle-like member and connected with said fingers to support the latter, and to heat said fingers to facilitate their removal from the frozen articles.

2. An apparatus of the character described comprising a receptacle-like member including a plurality of molds depending from the bottom thereof, and adapted to be filled with a liquid substance to be frozen therein, a heating unit arranged within the receptacle-like member, fingers carried by and depending from said heating unit and adapted to be positioned within the mold to provide the articles frozen therein with centrally located stick-receiving bores, subsequent to the removal of said fingers, said fingers being adapted to be heated from said unit prior to their removal from the frozen articles, and means supporting the heating unit within the receptacle-like member for removal therefrom whereby all of the fingers are simultaneously removed from the frozen articles.

3. An apparatus of the character described comprising a receptacle-like member including a plurality of molds depending from the bottom thereof, and adapted to be filled with a liquid substance to be frozen therein, a frame-like member removably positioned within the receptacle-like member to repose upon the bottom thereof, a heating unit supported by the frame-like member, and a plurality of fingers depending from said heating unit and adapted to be positioned in said molds, to provide the articles frozen therein with centrally located stick-receiving bores, and adapted to be heated by said unit prior to their removal from said frozen articles.

4. An apparatus of the character described comprising a receptacle-like member including a plurality of molds depending from the bottom theroef and adapted to be filled with a liquid substance to be frozen therein, a frame-like member removably positioned within the receptacle-like member and reposing upon the bottom thereof, said frame-like member having a plurality of spaced openings disposed above the molds, a heating unit supported by the frame-like member, and a plurality of fingers depending from said unit and passed through the openings of said frame into said molds, to provide the articles frozen therein with centrally located stick-receiving bores, said fingers being simultaneously removed from the frozen articles with the removal of the frame from said receptacle-like members.

5. An apparatus of the character described comprising a receptacle-like member including a plurality of molds depending from the bottom thereof and adapted to be filled with a liquid substance to be frozen therein, fingers adapted to be suspended in said molds to provide the articles frozen therein with centrally located stick-receiving bores, a heating coil adapted to be positioned within the receptacle-like member and connected with said fingers to heat the latter prior to their removal from the frozen articles.

In testimony whereof I affix my signature.

EZRA MORONI PETERSON.